United States Patent Office 2,753,251
Patented July 3, 1956

2,753,251

HERBICIDAL HALOPHENYL-ALKYL-UREAS

Henry J. Gerjovich, Wilmington, Del., assignor to E. I. du Pont de Nemours and Company, Wilmington, Del., a corporation of Delaware No Drawing. Application October 26, 1954,
Serial No. 464,881

5 Claims. (Cl. 71—2.6)

This invention relates to certain tetra-substituted ureas and to herbicidal compositions and methods employing the compounds. More specifically, it relates to 1-(halophenyl)-1,3-dialkyl-3-methylureas represented by the formula (1) 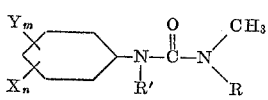

where X is halogen, n is a positive integer up to three, Y is selected from the group consisting of hydrogen and alkyl of 1 to 4 carbon atoms, m is a positive integer up to two, and R and R' are alkyl groups of 1 to 8 carbon atoms with the proviso that the R and R' groups taken together contain at least four carbon atoms, e. g., if one of them is methyl, the other must be propyl or higher, and if one is ethyl, the other must be ethyl or higher.

X, in Formula 1 above, is preferably chlorine and Y is hydrogen or methyl. Preferably, at least one of the ortho positions is unsubstituted; or stating it in other words, there is no substituent on at least one of the nuclear carbons of the benzene nucleus ortho to the nuclear carbon to which the urea nitrogen atom is linked. In those cases where Y is hydrogen, the most preferred compounds are those in which there is chlorine on the para position of the benzene nucleus.

The halophenyl trialkylureas of the invention are suitably prepared, for example, by reaction of an N-alkyl carbanilyl chloride with a dialkyl amine. The process is illustrated by the following equation but it will be understood that by suitable choice of the carbamyl chloride and amine reactants, the other tetra-substituted ureas of the invention are similarly prepared.

(2) 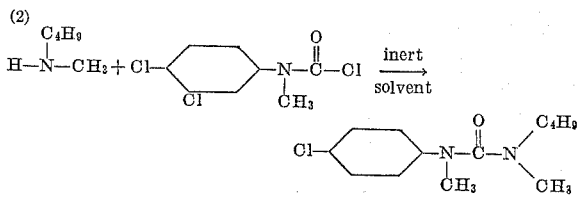

The carbamyl chloride-amine reaction is most readily carried out in the presence of an inert solvent such as dioxane, ethyl ether, toluene, xylene, or anisole. The reaction proceeds more rapidly at somewhat elevated temperatures, say, at the reflux temperature of the reaction medium. No catalyst is needed.

Alternatively, the compounds of the invention can be prepared by reaction of N-alkyl substituted analines with a dialkyl carbamyl chloride, preferably in an inert solvent at elevated temperature.

The halophenyl trialkylureas of the invention are generally high boiling oily liquids. They can be distilled under high vacuum without substantial decomposition.

Illustrative of compounds of the invention represented by Formula 1 above are:

1-(p-chlorophenyl)-1,3-dimethyl-3-n-propyl urea
1-(p-bromophenyl)-1,3-dimethyl-3-isopropylurea
1-(m-chlorophenyl)-1,3-dimethyl-3-n-butylurea
1-(o-chlorophenyl)-1,3-dimethyl-3-isobutylurea
1-(p-chlorophenyl)-1,3-dimethyl-3-n-octylurea
1-(p-fluorophenyl)-3,3-dimethyl-1-n-propylurea
1-(m-chlorophenyl)-3-butyl-3-methyl-1-n-amylurea
1-(p-chlorophenyl)-3,3-dimethyl-1-octylurea
1-(p-chlorophenyl)-3-methyl-1,3-dipropylurea
1-(3,4-dichlorophenyl)-1,3-dimethyl-3-n-butylurea
1-(3,4-dichlorophenyl)-1,3-dimethyl-3-hexylurea
1-(3,4-dichlorophenyl)-1,3-dimethyl-3-isopropylurea
1-(3,4-dichlorophenyl)-1,3-dimethyl-3-secbutylurea
1-(3,4-dichlorophenyl)-1,3-dimethyl-3-octylurea
1-(3,4-dichlorophenyl)-3,3-dimethyl-1-n-propylurea
1-(3,4-dichlorophenyl)-3,3-dimethyl-1-n-hexylurea
1-(3,4-dichlorophenyl)-3,3-dimethyl-1-n-butylurea
1-(3,4-dichlorophenyl)-3,3-dimethyl-1-octylurea
1-(3,4-dichlorophenyl)-1,3-dibutyl-3-methylurea
1-(3-chloro-p-tolyl)-1,3-dimethyl-3-n-propylurea
1-(3-chloro-p-tolyl)-1,3-dimethyl-3-hexylurea
1-(3-chloro-4-ethylphenyl)-1,3-di-n-butyl-3-methylurea
1-(3-chloro-sec-butylphenyl)-3,3-dimethyl-1-n-propylurea
1-(2,4,5-trichlorophenyl)-3,3-dimethyl-1-propylurea
1-(2,4,5-trichlorophenyl)-1,3-dimethyl-3-isobutylurea
1-(2,4,5-trichlorophenyl)-3,3-dimethyl-1-hexylurea
1-(2,4,5-trichlorophenyl)-1-butyl-3-hexyl-1-methylurea
1-(2,4-dimethyl-5-chlorophenyl)-1,3-dimethyl-3-n-propylurea
1-(3,4-dimethyl-5-chlorophenyl)-3,3-dimethyl-1-amylurea
1-(2,4-dimethyl-5-chlorophenyl)-1,3-dimethyl-3-octylurea
1-(2,5-dimethyl-3-chlorophenyl)-1,3-dimethyl-3-n-butylurea
1-(2,4-dimethyl-5-chlorophenyl)-1,3-dibutyl-3-methylurea
1-(3,4-dichlorophenyl)-1,3-diethyl-3-methylurea
1-(3-chloro-4-methylphenyl)-1,3-diethyl-3-methylurea The compounds of the invention are highly effective for the control of weeds or in preventing undesirable plant growth by foliar application or preemergence application. The compounds are unusual among substituted urea generally because they have relatively high solubility in common organic solvents and thus permit the preparation of concentrated liquid herbicidal formulations.

In order to utilize the pest control properties of the halophenyl trialkylureas of the invention to best advantage, the compounds are formulated by admixture with a carrier material or conditioning agent of the kind used and referred to in the art as a pest control adjuvant or modifier in order to provide formulations adapted for ready and efficient application to soil, weeds, or unwanted plants using conventional applicator equipment. Thus the compounds are formulated in compositions which take the form of solutions, dusts, water-dispersible powders, aqueous dispersions, or emulsions.

By the term "pest control adjuvant," I mean a substance which is capable of presenting or aiding in the presentation of an active compound to the pest which in this case is unwanted plants. The term "adjuvant" is well established in the art where it is recognized that an active agent or toxicant is in itself of little practical utility for combatting pests unless it be presented in the form suitable for effecting intimate contact of the agent or its vapors, as the particular case may require, with the pest, be the pest insects, fungi, mites, or weeds. Thus additional material or materials are employed in the formulation of an active agent to yield a suitable pest control composition, such materials being adjuvants. Such materials are also sometimes called conditioning agents since they are materials which are added to the active ingredient to assist in bringing it into a condition suitable for application.

Pest control adjuvants such as the dusts, solvents, wetting, dispersing, and emulsifying agents set out in U. S. Patent 2,426,417 can be employed in preparing the herbicidal compositions of the present invention. Other wetting, dispersing, and emulsifying agents such as those listed in detail in Bulletin E 607 of the Bureau of Entomology and Plant Quarantine of the U. S. Department of Agriculture and such as those set out in an article by McCutcheon in Chemical Industries, November 1947, page 811, entitled "Synthetic Detergents" may also be used.

Preferably the herbicidal compositions of the invention are in the form of "concentrates" suitable for dispersion in water to give aqueous spray compositions. A suitable emulsifiable oil concentrate is obtained, for example, by adding a dispersing or emulsifying agent to a halophenyl trialkyl urea of the invention, a solvent also being employed if desired. Preferably the dispersing or emulsifying agent is one which is soluble in the compound, or the solvent, and ordinarily the agent will not comprise more than 10% by weight of the emulsifiable oil composition and with the better adjuvant materials, the percentage will be 5% or less.

Less concentrated emulsifiable oil concentrates are prepared by dissolving a tetra-substituted urea of the invention and a wetting, dispersing, or emulsifying agent in a solvent of the type conventionally used in the preparation of herbicidal compositions.

Dust compositions of the invention contain a halophenyl trialkyl urea of the invention adsorbed on finely divided carriers on dusts such as talc, pyrophyllite, natural clays, diatomaceous earths, and other powdered diluents such as those set out in the aforementioned United States patent.

The dust compositions of the invention are prepared by mixing intimately the tetra-substituted urea with the powered carrier. Alternatively, the toxic compound can be dissolved in a volatile solvent such as acetone and the solution thus obtained then mixed with the powdered carrier and the solvent subsequently removed from the composition by evaporation.

Water-dispersible powders of the invention can be prepared by admixing one or more of the compounds of the invention with a surface-active dispersing agent and a finely divided solid carrier or dust such as those mentioned heretofore, the surface-active agent being used in amount sufficient to impart water dispersibility to the powder.

The content of the active compound or compounds of the invention in the herbicidal compositions of the invention will vary according to the manner in which and the purpose for which the composition is to be applied but, in general, will be from 0.5 to 95% by weight of the composition.

The active compounds of the invention are applied either as a spray or a dust to the locus or area to be protected from undesirable plant growth. The active compound is, of course, applied in amount sufficient to exert the desired herbicidal action. The application can be made directly upon the locus or area and the vegetation thereon during the period of infestation or, alternatively, the application can be made in advance of an anticipated weed infestation.

The compositions of the invention may include fungicides such as zinc dimethyl dithiocarbamate, zinc ethylene bis-dithiocarbamate, and manganese ethylene bis-dithiocarbamate; insecticides such as DDT, methoxychlor, chlordane; other fungicides and insecticides such as those set out in U. S. Patent 2,426,417; and may include fertilizers to form either powdery or granular compositions that can be used in the cultivation of agricultural crops.

In order that the invention may be better understood, the following examples are given in addition to the examples already given above.

*Example 1*

40.8 parts by weight of N-propyl-3,4-dichloroaniline was added to 22.0 parts by weight of phosgene dissolved in 300 parts by weight of anhydrous xylene. The mixture was refluxed under anhydrous conditions until HCl no longer evolved from the reaction. There resulted a clear solution of N-propyl-3,4-dichlorocarbanilyl chloride.

After cooling the solution of N-propyl-3,4-dichlorocarbanilyl chloride to room temperature, an excess of dimethylamine was added thereto. The resulting mixture was heated at reflux temperature for one hour and then filtered to remove the solid dimethylamine hydrochloride which formed. The filtrate was washed with water until the washings were neutral, then dried, filtered, and distilled. 29.6 parts by weight of the product 1-(3,4-dichlorophenyl)-1-propyl-3,3-dimethylurea was obtained, B. P. 134–135° C. at 0.2 mm. mercury, $n_d^{25}=1.5548$.

*Analysis.*—Calc'd for $C_{12}H_{16}ON_2Cl_2$: N, 10.19; Cl, 25.80. Found: N, 10.38; Cl, 25.13.

*Example 2*

A total of 18.0 parts by weight of N-methyl-3,4-dichloroaniline was added slowly to a stirring solution of 250 parts by weight of xylene (anhydrous) containing 22 parts by weight of phosgene. The entire mixture was heated at reflux temperature under anhydrous conditions until HCl no longer evolved from the reaction. The clear solution of the corresponding N-methyl-3,4-dichlorocarbanilyl chloride thus obtained was cooled to room temperature and treated with 20.2 parts by weight of triethylamine and 18.0 parts by weight of N-methyl butyl amine with vigorous stirring. The mixture was heated at reflux temperature for one hour to insure complete interaction. Filtration of this hot mixture removed most of the triethyl amine hydrochloride. The clear xylene filtrate was washed with water until the washings were neutral to pH paper, dried over $MgSO_4$, filtered and distilled. 1-(3,4-dichlorophenyl)-1,3-dimethyl-3-n-butylurea, an oil, was obtained boiling at 140–142° C. at 0.2 mm. Hg pressure. 36 parts by weight of the product was obtained, $n_d^{24°}=1.5505$.

*Analysis.*—Calc'd for $C_{13}H_{18}Cl_2N_2O$: N, 9.70; Cl, 24.60. Found: N, 9.63; Cl, 24.36.

*Example 3*

49.2 parts by weight of N-hexyl-3,4-dichloroaniline was added gradually over a period of 0.5 hour to a stirring solution of 22 parts by weight of phosgene contained in 250 parts by weight of anhydrous xylene. This mixture was heated at reflux temperature under anhydrous conditions unitil HCl no longer evolved from the reaction. The resulting clear xylene solution containing N-hexyl-3,4-dichlorocarbanilyl chloride was cooled to room temperature and treated with 20.2 parts by weight of triethyl amine followed by the addition of excess dimethylamine. This entire mixture was heated at reflux temperature with stirring to insure complete interaction. Filtration of the hot mixture removed substantially all the triethylamine hydrochloride formed. 1-(3,4-dichlorophenyl)-1-hexyl-3,3-dimethylurea was obtained by distillation of the remaining xylene filtrate under reduced pressure until the product was substantially xylene-free. 61.0 parts by weight of the 1-(3,4-dichlorophenyl)-1-hexyl-3,3-dimethylurea, a viscous yellow oil product, was obtained, $n_d^{24°}=1.5582$.

*Analysis.*—Calc'd for $C_{15}H_{22}Cl_2N_2O$: N, 8.83; Cl, 22.40. Found: N, 8.98; Cl, 21.50.

*Example 4*

A water-dispersible herbicidal powder is obtained by admixing 1-(p-chlorophenyl)-1,3,3 - trimethylurea prepared as in Example 1 with finely divided fuller's earth and bentonite in the following proportions by weight:

35% 1-(p-chlorophenyl)-1,3,3-trimethylurea
5% bentonite
60% fuller's earth

The water-dispersible powdered composition of this example is free flowing and is easily dispersed in water to give a relatively stable suspension in an aqueous spray composition. A spray composition suitable for application for the control of such weeds as Johnson grass and quack grass is obtained by the dispersion of the composition of this example in water in the proportions of 0.25 pound of the composition per gallon of water.

*Example 5*

1 - (3 - chloro-p-tolyl)-1,3-dimethyl-3-hexylurea is admixed with 5% by weight of a proprietary wetting, dispersing, and emulsifying agent having as its effective ingredient diethyl cyclohexylamine dodecyl sulfate.

The emulsifiable oil concentrate of this example is readily dispersible in water to obtain aqueous spray compositions which are effective in application for the control of undesired plant growth.

*Example 6*

A herbicidal dust is prepared by admixing 1-(2,4,5-trichlorophenyl)-3,3-dimethyl - 1 - n - propylurea with talc in the proportions of about 32 parts by weight of talc for each part by weight of the urea compound.

The dust composition of this example is free flowing and easily broadcast over an area to be protected from weeds.

The following three examples illustrate emulsifiable oil compositions which are especially adapted for dispering in water to give emulsions suitable for application to the area to be protected from weeds. The parts are by weight.

*Example 7*

25% 1 - (m - chlorophenyl) - 1,3 - dimethyl - 3 - n-butylurea
70% alkylated naphthalene (solvent)
5% alkyl aryl polyether alcohol (emulsifying agent)

*Example 8*

50% 1 - (3 - chloro - secbutylphenyl) - 3,3 - dimethyl-1-n-propylurea
45% alkylated naphthalene
5% polyoxyalkylene sorbitol laurate (emulsifying agent)

*Example 9*

25% 1 - (2,4 - dimethyl - 5 - chlorophenyl) - 1,3-dimethyl-3-n-propylurea
70% alkylated naphthalene
5% alkyl aryl polyether alcohol It will be understood that in place of the specific compounds prepared or formulated according to the foregoing detailed examples, other compounds of the invention can be similarly made, formulated and used. Thus the foregoing detailed description has been given for clearness of understanding only and no unnecessary limitations are to be understood therefrom. The invention is not limited to the exact details shown and described for obvious modifications will occur to those skilled in the art.

I claim:

1. A method for the control of unwanted plants which comprises applying to a locus to be protected, in amount sufficient to exert a herbicidal action, a halophenyl trialkyl urea represented by the formula

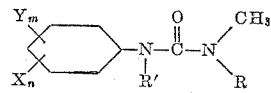

where X is halogen, $n$ is a positive integer up to three, Y is selected from the group consisting of hydrogen and alkyl of 1 to 4 carbon atoms, $m$ is a positive integer up to two, and R and R' are alkyl groups of 1 to 8 carbon atoms with the proviso that the R and R' groups taken together contain at least four carbon atoms.

2. A herbicidal composition comprising, in admixture with a pest control adjuvant, a halophenyl trialkyl urea represented by the formula

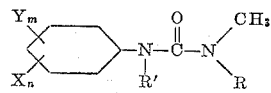

where X is halogen, $n$ is a positive integer up to three, Y is selected from the group consisting of hydrogen and alkyl of 1 to 4 carbon atoms, $m$ is a positive integer up to two, and R and R' are alkyl groups of 1 to 8 carbon atoms with the proviso that the R and R' groups taken together contain at least four carbon atoms.

3. A halophenyl trialkyl urea represented by the formula

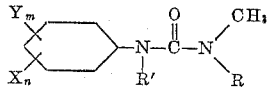

where X is halogen, $n$ is a positive integer up to three, Y is selected from the group consisting of hydrogen and alkyl of 1 to 4 carbon atoms, $m$ is a positive integer up to two, and R and R' are alkyl groups of 1 to 8 carbon atoms with the proviso that the R and R' groups taken together contain at least four carbon atoms.

4. 1-(3,4-dichlorophenyl)-1,3-dimethyl-3-n-butylurea.

5. 1 - (3,4 - dichlorophenyl) - 3,3 - dimethyl - 1 - n-propylurea.

References Cited in the file of this patent

UNITED STATES PATENTS

| | | |
|---|---|---|
| 2,336,464 | Buck et al. | Dec. 14, 1943 |
| 2,374,485 | Haury | Apr. 24, 1945 |
| 2,655,444 | Todd | Oct. 13, 1953 |
| 2,655,534 | Searle | Oct. 13, 1953 |
| 2,704,245 | Searle | Mar. 15, 1955 |